(12) United States Patent
Kim

(10) Patent No.: US 12,444,279 B2
(45) Date of Patent: Oct. 14, 2025

(54) METHOD AND APPARATUS FOR PROCESSING PAYMENTS FOR PRODUCTS IN UNMANNED STORE

(71) Applicant: GAEASOFT CO., LTD., Seoul (KR)

(72) Inventor: Young Jun Kim, Seoul (KR)

(73) Assignee: GAEASOFT CO., LTD., Seoul (KR)

( * ) Notice: Subject to any disclaimer, the term of this patent is extended or adjusted under 35 U.S.C. 154(b) by 0 days.

(21) Appl. No.: 18/847,342

(22) PCT Filed: Mar. 6, 2023

(86) PCT No.: PCT/KR2023/002998
§ 371 (c)(1),
(2) Date: Sep. 16, 2024

(87) PCT Pub. No.: WO2023/204436
PCT Pub. Date: Oct. 26, 2023

(65) Prior Publication Data
US 2025/0218258 A1    Jul. 3, 2025

(30) Foreign Application Priority Data
Apr. 20, 2022  (KR) .................. 10-2022-0049139

(51) Int. Cl.
*G06K 7/14* (2006.01)
*B07C 5/34* (2006.01)
*G07G 1/00* (2006.01)

(52) U.S. Cl.
CPC ......... *G07G 1/0072* (2013.01); *B07C 5/3412* (2013.01); *G06K 7/1413* (2013.01)

(58) Field of Classification Search
CPC .. G07G 1/0072; G07G 1/0036; B07C 5/3412; G06K 7/1412; G06Q 20/20; G06Q 20/208
(Continued)

(56) References Cited

U.S. PATENT DOCUMENTS 5,770,848 A * 6/1998 Oizumi .............. G06K 7/10831
  235/462.07
2014/0129362 A1 * 5/2014 Marquis ............... G07G 1/0036
  705/23

(Continued)

FOREIGN PATENT DOCUMENTS

EP     2985242 A1 * 2/2016 ............... B07C 3/08
KR  10-2005-0096017 A   10/2005
(Continued)

*Primary Examiner* — Edwyn Labaze
(74) *Attorney, Agent, or Firm* — Bridgeway IP Law Group, PLLC; Jihun Kim

(57) ABSTRACT

An unmanned store product checkout device according to one embodiment may include a conveying unit that conveys products, a product recognition unit that recognizes that the products have been placed on the conveying unit, a scanning unit that scans barcodes and images of the products conveyed by the conveying unit, a weight sensor that measures weights of the scanned products, a processor that identifies the products, a product sorting unit that sorts the products into a first zone or a second zone based on a result of identifying the products, and a checkout unit that calculates a total price by adding up a first price, which is a sum of prices of the products sorted into the first zone, and a second price, which is a sum of prices of the products sorted into the second zone and checked by an administrator.

8 Claims, 10 Drawing Sheets

(58) Field of Classification Search
USPC .................. 235/383, 375, 487; 705/5, 13, 23
See application file for complete search history.

(56) References Cited

U.S. PATENT DOCUMENTS

| | | | | |
|---|---|---|---|---|
| 2015/0194023 | A1* | 7/2015 | Brackenridge | G06Q 30/06 |
| | | | | 235/383 |
| 2020/0324974 | A1* | 10/2020 | Gorman | B65G 11/023 |
| 2023/0147769 | A1* | 5/2023 | Hagen | G06Q 20/208 |
| | | | | 705/23 |

FOREIGN PATENT DOCUMENTS

| | | |
|---|---|---|
| KR | 10-2019-0008075 A | 1/2019 |
| KR | 10-1998525 B1 | 7/2019 |
| KR | 10-2020-0097671 A | 8/2020 |
| KR | 10-2020-0112726 A | 10/2020 |
| KR | 10-2500437 B1 | 2/2023 |

* cited by examiner

METHOD AND APPARATUS FOR PROCESSING PAYMENTS FOR PRODUCTS IN UNMANNED STORE

TECHNICAL FIELD

The present disclosure relates to an unmanned store product checkout method and device.

BACKGROUND ART

The statements in this section merely provide background information related to the present disclosure and do not necessarily constitute prior art.

Attempts are being made to reduce manpower and increase accuracy by automating an entire logistics process, including product production, shipping, transportation, unloading, packaging, storage, and checkout, without human intervention. In the case of automating logistics, there is an effect of reducing costs due to personnel reduction and preventing safety accidents, and a time required for logistics may be shortened and systematic management may be achieved.

In particular, when checking products in a store, there is a problem in that a store staff performs barcode scanning for respective products through a barcode scanning device to perform a product checkout, which increases a time required for the product checkout, resulting in an increase in unnecessary malicious customer waiting times, which in turn increases store congestion, and increases store operation and management costs due to hiring staffs for the product checkout.

Accordingly, there is a demand for a technology that can quickly and accurately perform a checkout for products a customer wants to check out without human intervention.

DISCLOSURE OF INVENTION

Technical Problem

An aspect of the present disclosure is to provide a product checkout method in an unmanned store.

Furthermore, an aspect of the present disclosure is to quickly and accurately perform a product checkout by increasing product recognition rate through artificial intelligence learning data.

In addition, an aspect of the present disclosure is to reduce store operation management costs through personnel reduction.

Technical Solution

In order to achieve the foregoing objectives, an unmanned store product checkout device according to one embodiment of the present disclosure may include a conveying unit that conveys products a user wants to purchase to scan the products, a product recognition unit provided at a first point where the conveyance of products is started by the conveying unit to recognize that products have been placed on the conveying unit so as to start the operation of the conveying unit, a scanning unit provided to be separated from the conveying unit by a preset distance so as to scan barcodes and images of products conveyed by the conveying unit, a weight sensor provided on a lower side of the conveying unit to measure weights for verifying the scanned products, a processor that identifies the products using artificial intelligence learning data based on the barcodes and images of the products scanned through the scanning unit and the weights of the products measured through the weight sensor, a product sorting unit provided at a second point where the conveyance of products is ended by the conveying unit to sort the products into a first zone or a second zone based on a result of identifying the products, and a checkout unit that calculates a total price by adding up a first price, which is a sum of prices of the products sorted into the first zone, and a second price, which is a sum of prices of the products sorted into the second zone and checked by an administrator.

The scanning unit may include a barcode scanner that recognizes barcodes of the products, and an image scanner that scans images of the products to acquire image information.

The processor may identify, when barcodes are recognized, the products as scanned products corresponding to identification information included in the barcodes, acquire, when the barcodes are not recognized, products names and text strings from the image information, and identify the products as scanned products based on the image information, product names, and text strings using artificial intelligence learning data, compare weights of the products measured using the weight sensor with weight information included in the product information corresponding to the scanned products, transmit, when the products are verified as the scanned products as a result of the comparison, a first signal instructing the scanned products to be sent to a user to the product sorting unit, and transmit, when the products are not identified as the scanned products or are verified as not the scanned products as a result of the comparison, a second signal instructing the products to be sent to an administrator to the product sorting unit.

The conveying unit may not operate when it is not recognized that a product has been placed thereon through the product recognition unit, operate, when it is recognized that a product has been placed thereon, to convey the product, and stop its operation when it is not recognized that another product has been placed until a preset period of time has elapsed subsequent to being recognized that a product has been placed through the product recognition unit.

In addition, an unmanned store product checkout method according to one embodiment of the present disclosure may include receiving user information from a user terminal, recognizing products placed on a conveying unit through a product recognition unit, scanning, when the products are recognized, the products conveyed by the conveying unit through a scanning unit, verifying the products based on a result of scanning the products, and sorting the products through a product sorting unit so as to allow the products to be sent to a user or administrator according to a result of the verification, calculating a total price by adding up prices of the sorted products through a checkout unit, and providing the total price to the user terminal.

The scanning of the products may include scanning, when barcode of the products are recognized, the barcodes to acquire scanned product information corresponding to the barcodes, scanning, when the barcodes of the products are not recognized, entire images of the products to acquire image information, designating, when the barcodes of the products are not recognized or the image information of the products is not acquired, the products as unchecked products, and acquiring, when the barcodes of the products are not recognized subsequent to the scanning of the products, product names of the products from the image information, and acquiring scanned product information corresponding to products for which image information has been acquired based on the image information and the product names using artificial intelligence learning data, wherein the artificial intelligence learning data includes data learned from sizes of products, product names, and weights of products to be sold in an unmanned store.

The sorting of the scanned products may include measuring weights of the products using a weight sensor, comparing the weight information of the scanned products included in the scanned product information with the measured weights of the products, sorting, when the products are verified as the scanned products as a result of the comparison, the products into a first zone so as to be sent to a user, and sorting, when the products are verified as different products as a result of the comparison or when the products are unchecked products, the products into a second zone so as to be sent to an administrator, and transmitting a number of products sorted into the second zone, device information, and the user information to an administrator terminal.

The calculating of the total price may include recognizing that all products sorted into the first zone or the second zone have been purchased by the user, and calculating a third price by adding up both a first price, which is a sum of prices of the products sorted into the first zone and a second price, which is a sum of prices of the products sorted into the second zone.

The receiving of the user information may include receiving the user's membership information generated using the user information, and subsequent to the providing of the total price, accumulating, when the user's payment for the products is completed, purchase points corresponding to the third price in member points included in the member information.

The accumulating of the purchase points may assign additional purchase points at a preset first ratio corresponding to a ratio of a number of products whose barcodes are recognized through the scanning unit to a number of products purchased by the user, and the providing of the total price may provide a fourth price with a discount rate of a preset second ratio corresponding to a section including the membership points applied to the third price to the user terminal.

Advantageous Effects

According to the present disclosure, a product checkout method in an unmanned store may be provided.

Furthermore, according to the present disclosure, product recognition rate may be increased through artificial intelligence learning data to quickly and accurately perform a product checkout.

In addition, according to the present disclosure, store operation management costs may be reduced by personnel reduction.

BEST MODE FOR CARRYING OUT THE INVENTION

Figure 1:
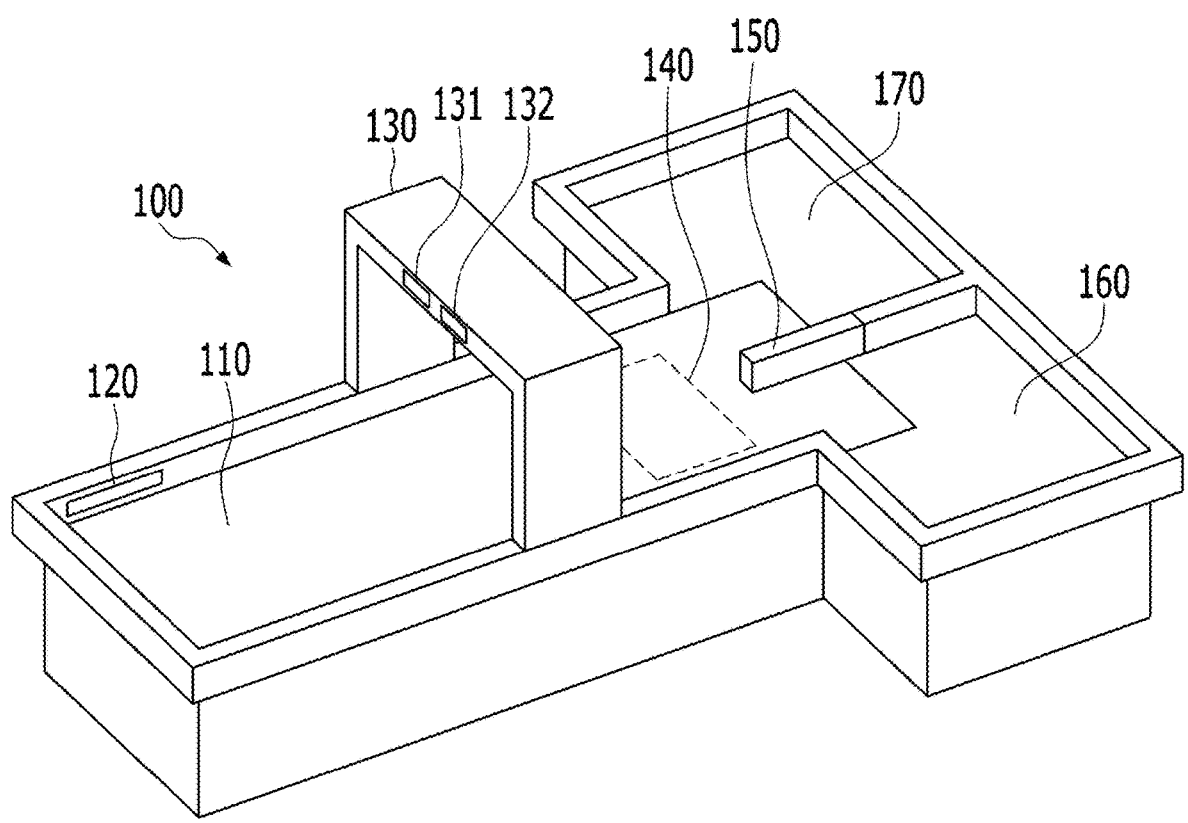
FIGS. 1 and 2 are drawings showing a configuration of an unmanned store product checkout device according to one embodiment of the present disclosure.

The present disclosure will be described in detail with reference to the accompanying drawings as follows. Here, the same reference numerals are used for the same components, and a redundant description, and a detailed description of known functions and configurations that may unnecessarily obscure the subject matter of the present disclosure will be omitted. Embodiments of the present disclosure are provided to more fully describe the present disclosure for those skilled in the art. Accordingly, the shapes and sizes of elements in the drawings may be exaggerated for clarity.

Throughout the specification, when a portion may "include" a certain element, unless specified otherwise, it may not be construed to exclude another element but may be construed to further include other elements.

Hereinafter, preferred embodiments of the present disclosure will be described in detail with reference to the accompanying drawings.

Figure 2:
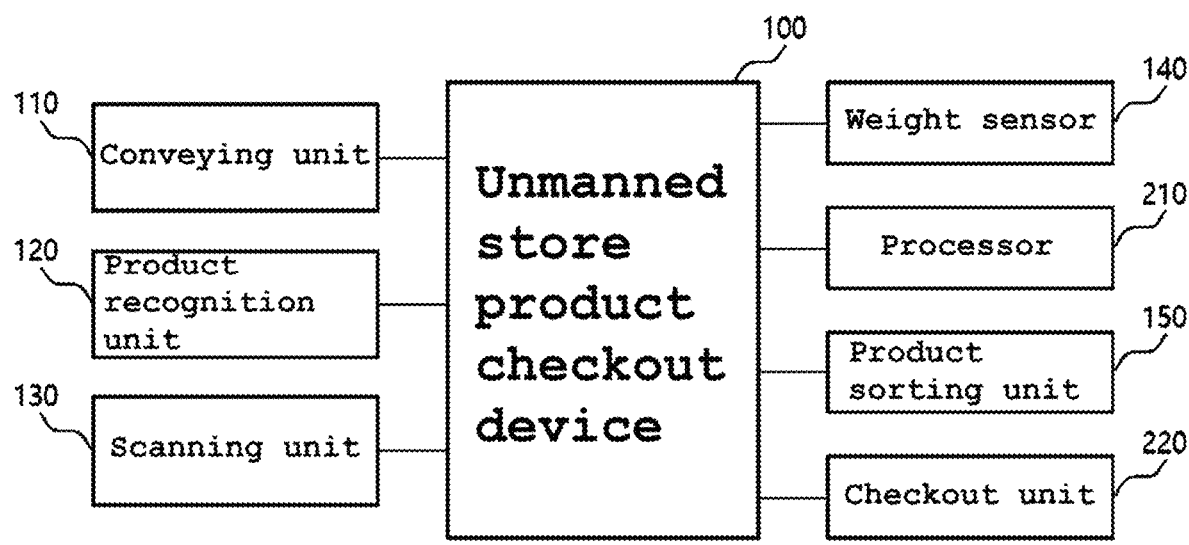

FIGS. 1 and 2 are drawings showing a configuration of an unmanned store product checkout device according to one embodiment of the present disclosure.

FIG. 1 is a diagram showing a shape of an unmanned store product checkout device according to one embodiment of the present disclosure.

FIG. 2 is a block diagram showing a configuration of an unmanned store product checkout device according to one embodiment of the present disclosure.

Referring to FIGS. 1 and 2, an unmanned store product device according to one embodiment of the present disclosure may include a conveying unit 110, a product recognition unit 120, a scanning unit 130, a weight sensor 140, a product sorting unit 150, a processor 210, and a checkout unit 220.

The conveying unit may convey a product a user wants to purchase to scan the product.

The product recognition unit may be provided at a first point where the conveyance of products is started by the conveying unit to recognize that products have been placed on the conveying unit so as to start the operation of the conveying unit.

The scanning unit may be provided to be separated from the conveying unit by a preset distance so as to scan barcodes and images of products conveyed by the conveying unit.

The weight sensor may be provided on a lower side of the conveying unit to measure weights for verifying the scanned products.

The processor may identify the products using artificial intelligence learning data based on the barcodes and images of the products scanned through the scanning unit and the weights of the products measured through the weight sensor.

The product sorting unit may be provided at a second point where the conveyance of products is ended by the conveying unit to sort the products into a first zone or a second zone based on a result of identifying the products.

The checkout unit that may calculate a total price by adding up a first price, which is a sum of prices of the products sorted into the first zone, and a second price, which is a sum of prices of the products sorted into the second zone and checked by an administrator.

Here, the conveying unit may not operate when it is not recognized that a product has been placed thereon through the product recognition unit, operate, when it is recognized that a product has been placed thereon, to convey the product, and stop its operation when it is not recognized that another product has been placed until a preset period of time has elapsed subsequent to being recognized that a product has been placed through the product recognition unit.

Figure 3:
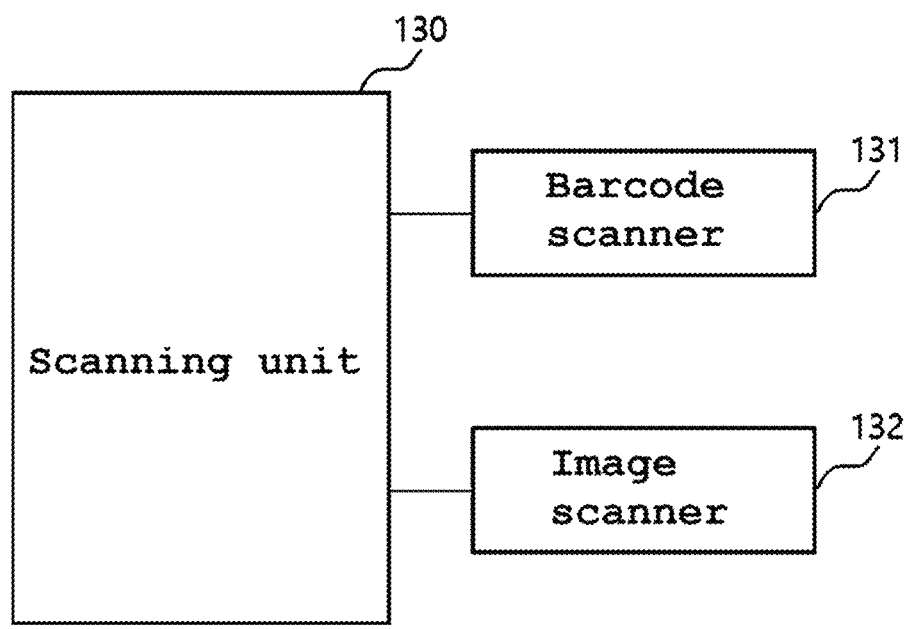
FIG. 3 is a block diagram showing a configuration of a scanning unit in an unmanned store product checkout device according to one embodiment of the present disclosure.

FIG. 3 is a block diagram showing a configuration of a scanning unit in an unmanned store product checkout device according to one embodiment of the present disclosure.

Referring to FIG. 3, the scanning unit of the unmanned store product checkout device according to one embodiment of the present disclosure may include a barcode scanner 131 and an image scanner 132.

The barcode scanner may recognize barcodes of the products.

The image scanner may scan images of the products to acquire image information.

The processor may identify, when barcodes are recognized, the products as scanned products corresponding to identification information included in the barcodes, acquire, when the barcodes are not recognized, products names and text strings from the image information, and identify the products as scanned products based on the image information, product names, and text strings using artificial intelligence learning data, In addition, the processor may compare weights of the products measured using the weight sensor with weight information included in the product information corresponding to the scanned products, and transmit, when the products are verified as the scanned products as a result of the comparison, a first signal instructing the scanned products to be sent to a user to the product sorting unit, and transmit, when the products are not identified as the scanned products or are verified as not the scanned products as a result of the comparison, a second signal instructing the products to be sent to an administrator to the product sorting unit.

As an optional embodiment, the unmanned store product checkout device may include a second product recognition unit provided at a third point where products enter the first zone to recognize the products sorted by the product sorting unit to be sent to the first zone.

Specifically, the second product recognition unit may recognize products that have been sorted by the product sorting unit and then moved to the first zone, and count a number of products that have moved to the first zone.

At this time, the unmanned store product checkout device may compare a number of times the first signal has been transmitted to be sent to the first zone through the processor with a number of products counted through the second product recognition unit, and prepare, when they are different as a result of the comparison, a list of products sorted to be sent to the first zone and transmit the list to the administrator terminal.

Here, the administrator may check the list through the administrator terminal, and check whether the products included in the list are sorted incorrectly.

This may solve, when a product verified as a scanned product is incorrectly sorted into the second zone, the problem through the check procedure.

Figure 4:
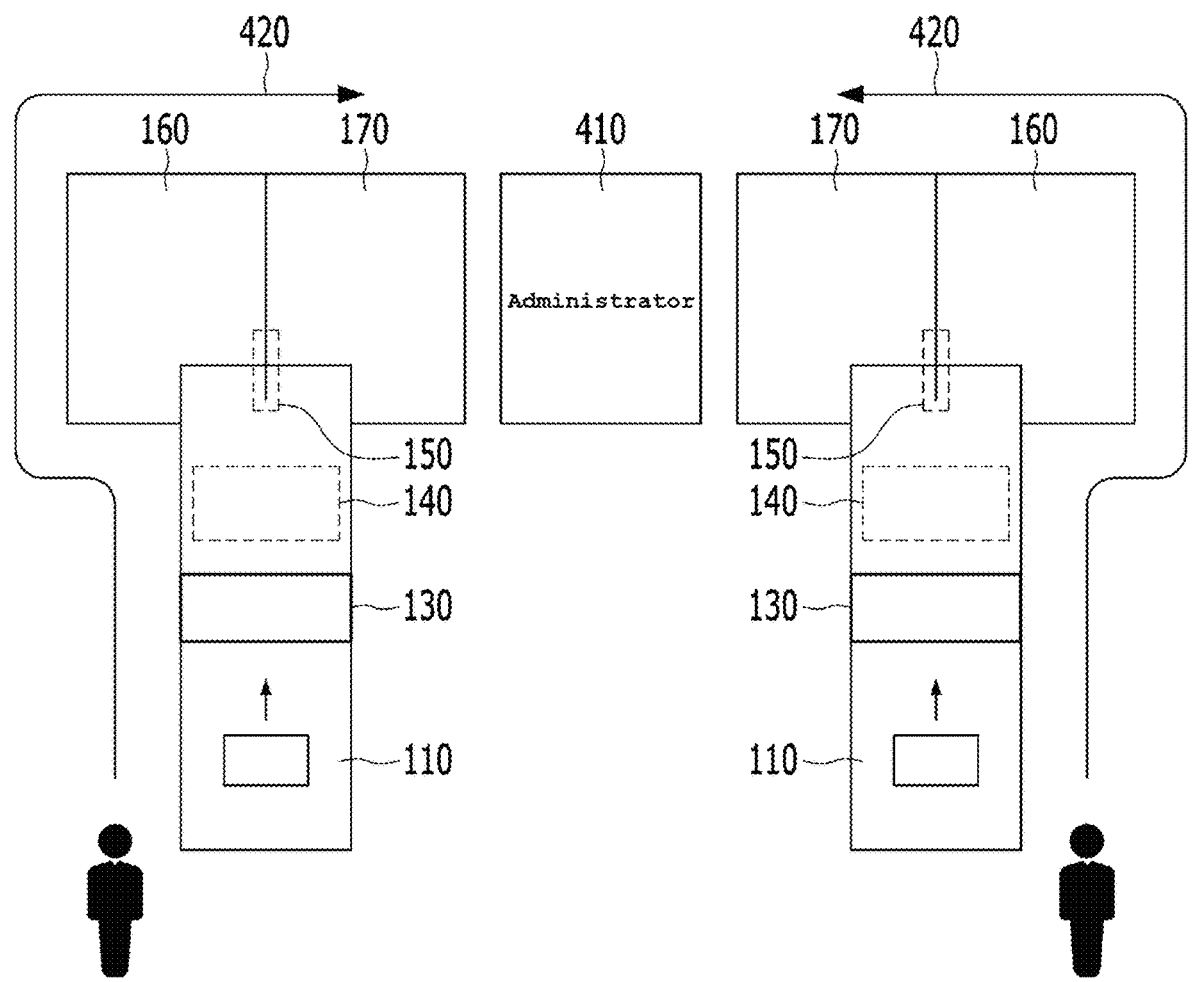
FIG. 4 is a drawing showing a user movement path and an administrator's position in an unmanned store product checkout device according to one embodiment of the present disclosure.

FIG. 4 is a drawing showing a user movement path and an administrator's position in an unmanned store product checkout device according to one embodiment of the present disclosure.

Referring to FIG. 4, in an unmanned store product checkout device according to one embodiment of the present disclosure, two devices may be placed side by side, and an administrator zone 410 may be located therebetween.

Here, of zones where products are sorted in respective devices, a zone located next to the administrator zone may be a second zone, and a zone on an opposite side thereto may be a first zone.

In this case, a user may place all the products the user wants to purchase on the conveying unit and then move along a movement path 420 through the first zone to the second zone to take the products the user has purchased.

This may allow one administrator to check unchecked products on two devices, thereby having an effect of reducing store operation management costs through personnel reduction.

Figure 5:
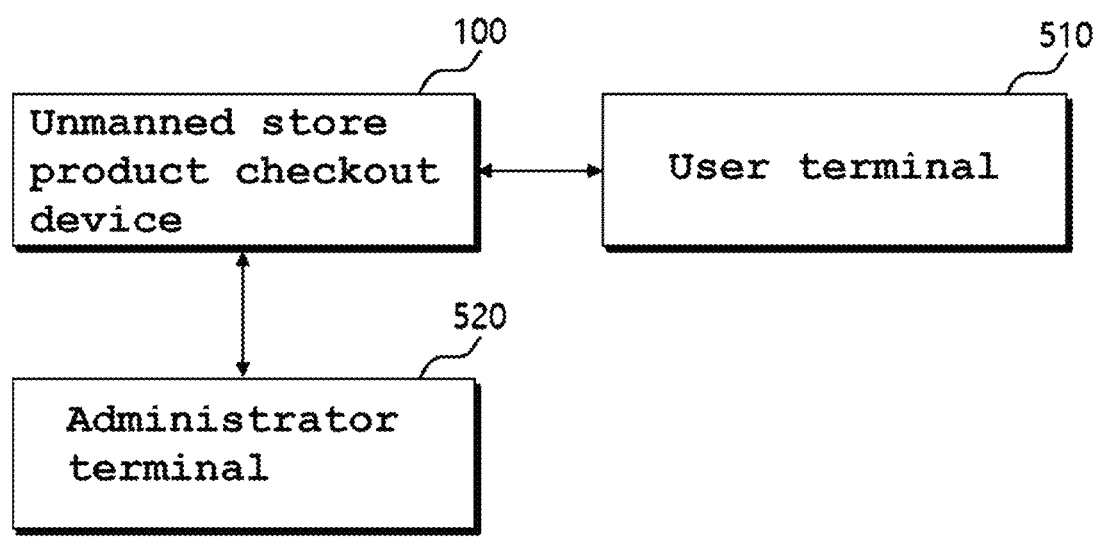
FIG. 5 is a block diagram showing entities for an unmanned store product checkout according to one embodiment of the present disclosure.

FIG. 5 is a block diagram showing entities for an unmanned store product checkout according to one embodiment of the present disclosure.

Referring to FIG. 5, entities for an unmanned store product checkout according to one embodiment of the present disclosure include an unmanned store product checkout device 100, a user terminal 510, and an administrator terminal 520.

The unmanned store product checkout device 100 may refer to a device that receives user information from the user terminal 510, recognizes that products scanned by a scanning unit are purchased by a user using the user terminal, and calculates a total price.

The unmanned store product checkout device 100 may be a device that provides the calculated total price to the user terminal 510.

The unmanned store product checkout device 100 may be a device that transmits information on unchecked products from among the scanned products to the administrator terminal 520.

The user terminal 510 may be a device that provides user information to the unmanned store product checkout device 100.

The user terminal 510 may be a device that receives a total price from the unmanned store product checkout device 100.

The administrator terminal 520 may be a device that receives information on unchecked products from among the scanned products from the unmanned store product checkout device 100.

The unmanned store product checkout device 100 and the user terminal 510, and the unmanned store product checkout device 100 and the administrator terminal 520 may respectively be connected to each other through a communication network.

The communication network refers to a connection path that allows data to be transmitted and received between the foregoing entities. For instance, the communication network may include wired networks such as local area networks (LANs), wide area networks (WANs), metropolitan area networks (MANs), and integrated service digital networks (ISDNs), or wireless networks such as wireless LANs, CDMAs, Bluetooths, and satellite communications, but the scope of the communication network applicable to the present disclosure is not limited thereto.

Figure 6:
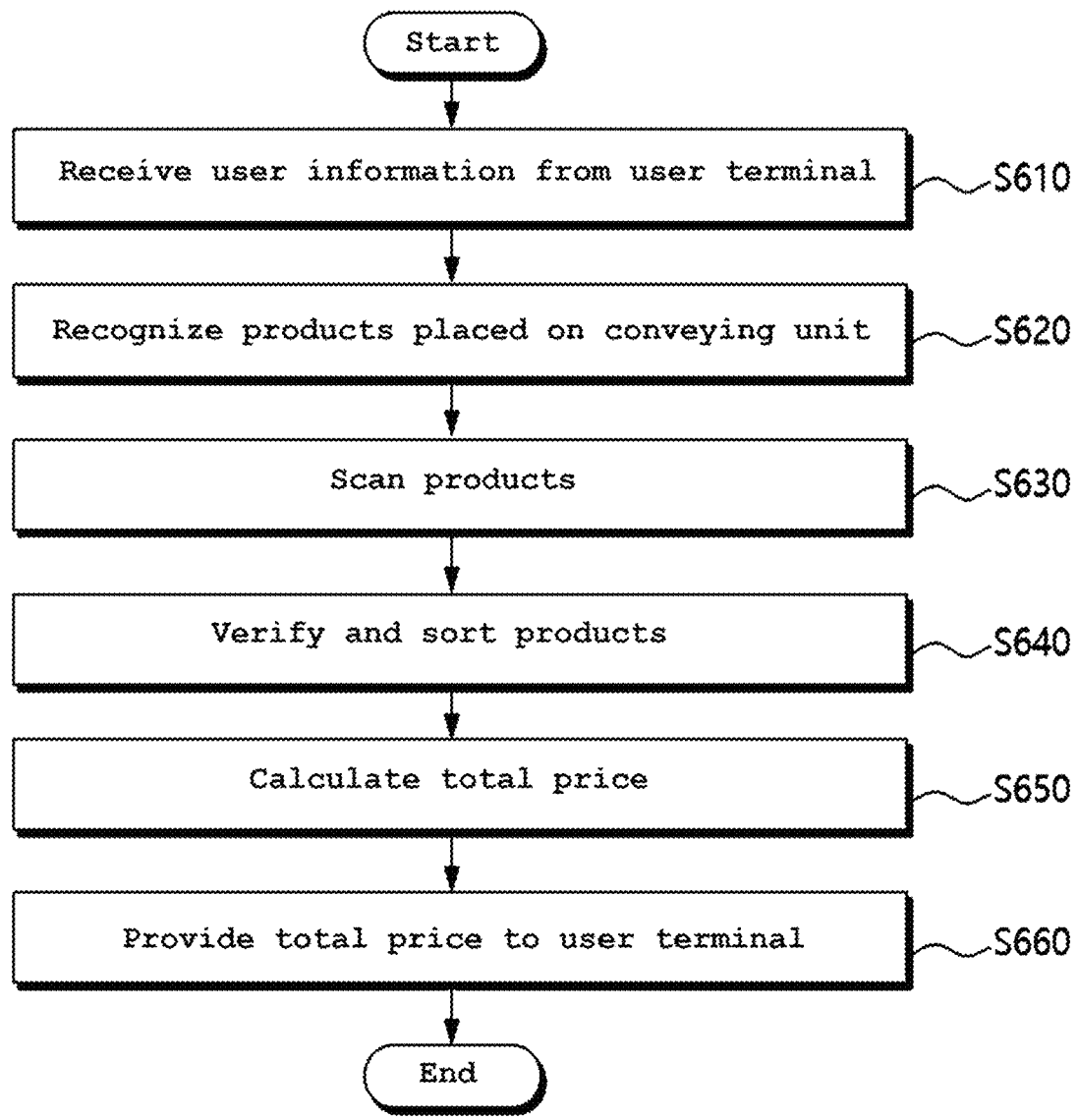
FIG. 6 is an operation flowchart showing an unmanned store product checkout method according to one embodiment of the present disclosure.

FIG. 6 is an operation flowchart showing an unmanned store product checkout method according to another embodiment of the present disclosure.

Referring to FIG. 6, an unmanned store product checkout method according to one embodiment of the present disclosure may first receive user information from a user terminal (S610).

Next, products placed on the conveying unit may be recognized through the product recognition unit (S620).

Next, when the products are recognized, the products conveyed by the conveying unit may be scanned through the scanning unit (S630).

At this time, when barcodes of the products are recognized, the barcodes may be scanned to acquire scanned product information corresponding to the barcodes, and when the barcodes of the product are not recognized, entire images of the products may be scanned to acquire image information.

In addition, when the barcodes of the products are not recognized or the image information of the products is not acquired, the products may be designated as unchecked products.

Next, the products may be verified based on a result of scanning the products, and the products may be sorted through a product sorting unit so as to allow the products to be sent to a user or administrator according to a result of the verification (S640).

Next, a total price may be calculated by adding up prices of the sorted products through a checkout unit (S650).

Next, the total price may be provided to the user terminal (S660).

Figure 7:
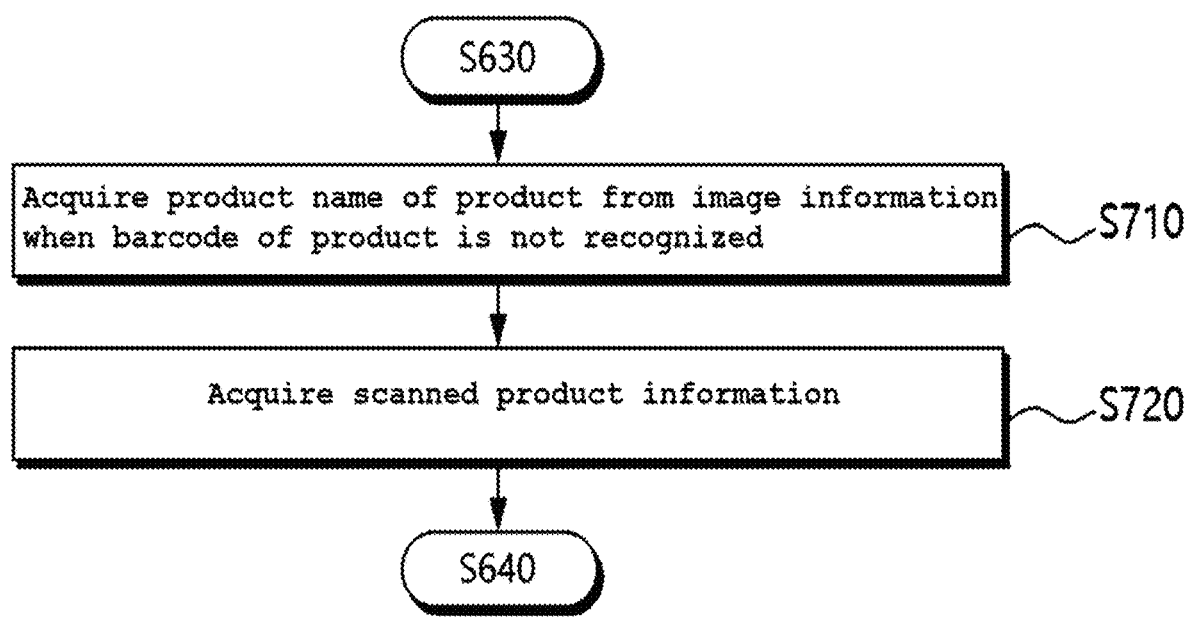
FIG. 7 is an operation flowchart showing an unmanned store product checkout method according to one embodiment of the present disclosure.

FIG. 7 is an operation flowchart showing an unmanned store product checkout method according to one embodiment of the present disclosure.

Referring to FIG. 7, in an unmanned store product checkout method according to one embodiment of the present disclosure, subsequent to the scanning of the product, when the barcode of the product is not recognized, a product name of the product may be acquired from the image information (S710).

Next, scanned product information corresponding to a product for which image information has been acquired based on the image information and the product name may be acquired using artificial intelligence learning data (S720).

Here, the artificial intelligence learning data may include data learned from sizes of products, product names, and weights of products to be sold in the unmanned store.

Figure 8:
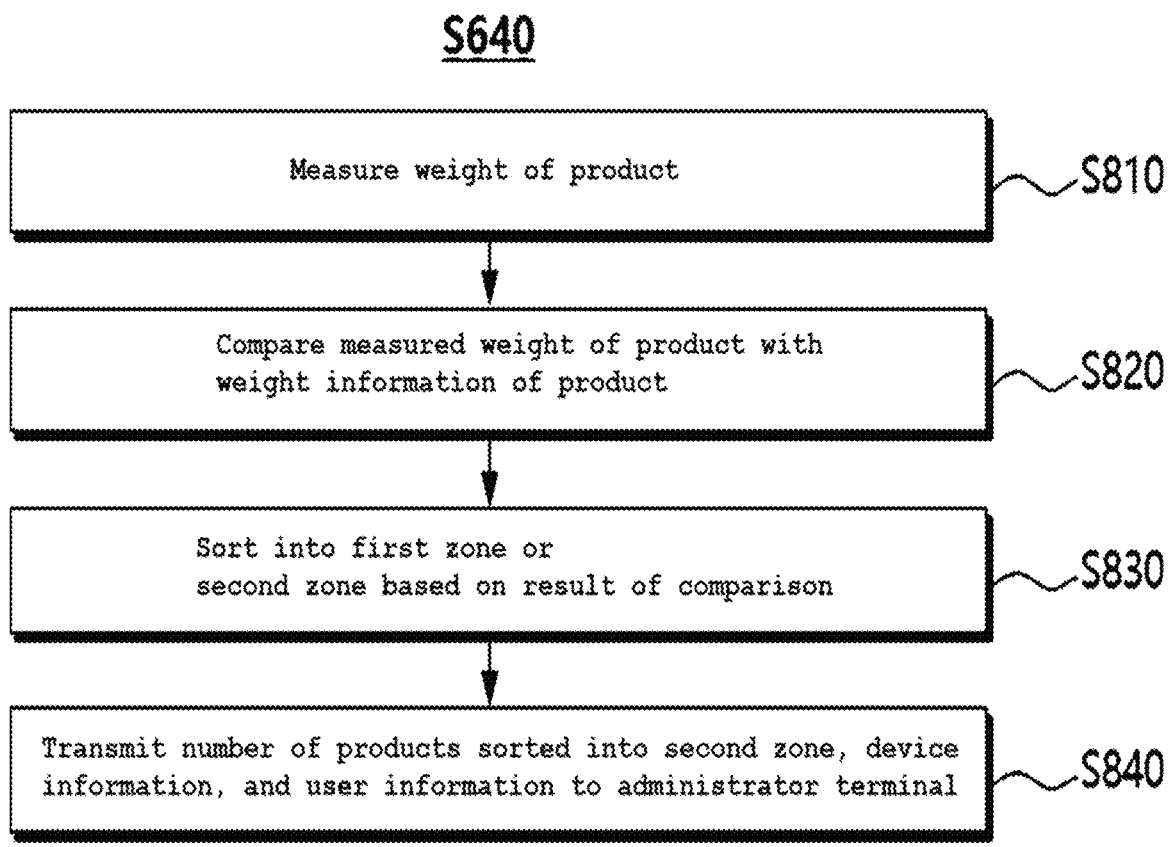
FIG. 8 is an operation flowchart showing an unmanned store product checkout method according to one embodiment of the present disclosure.

FIG. 8 is an operation flowchart showing an unmanned store product checkout method according to one embodiment of the present disclosure.

Referring to FIG. 8, an unmanned store product checkout method according to one embodiment of the present disclosure may first measure a weight of the product using a weight sensor (S810).

Next, the weight information of the scanned product included in the scanned product information may be compared with the measured weight of the product (S820).

Next, when the product is verified as the scanned product as a result of the comparison, the product may be sorted into a first zone so as to be sent to a user, and when the product is verified as a different product as a result of the comparison or when the product is an unchecked product, the product may be sorted into a second zone so as to be sent to an administrator (S830).

Next, a number of products sorted into the second zone, device information, and the user information may be transmitted to the administrator terminal (S840).

In this case, the step S650 may recognize that all products sorted into the first zone or the second zone have been purchased by the user, and calculate a third price by adding up both a first price, which is a sum of prices of the products sorted into the first zone and a second price, which is a sum of prices of the products sorted into the second zone.

Figure 9:
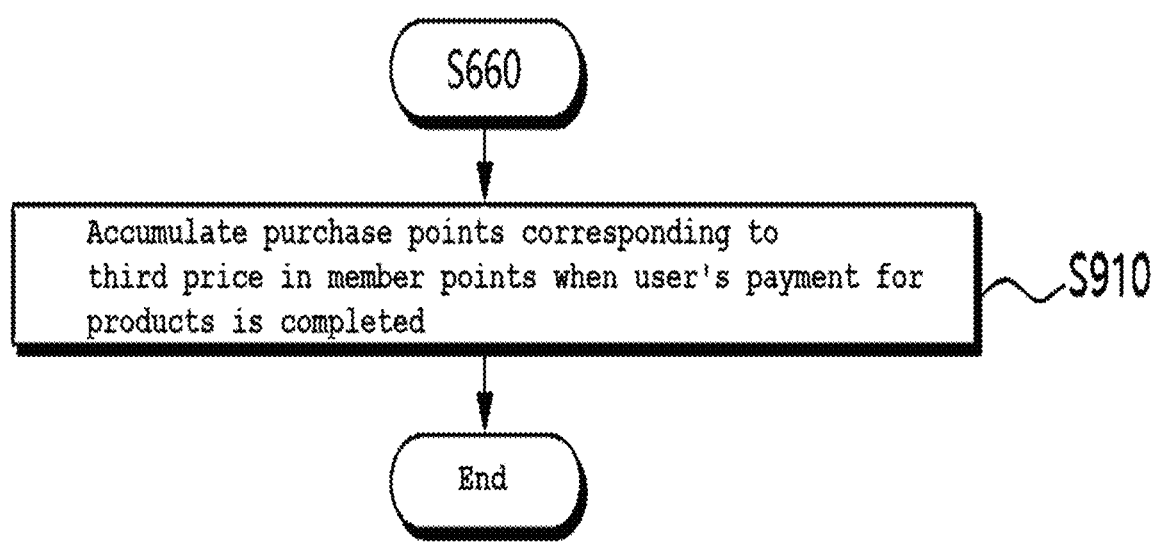
FIG. 9 is an operation flowchart showing an unmanned store product checkout method according to one embodiment of the present disclosure.

FIG. 9 is an operation flowchart showing an unmanned store product checkout method according to one embodiment of the present disclosure.

Referring to FIG. 9, an unmanned store product checkout method according to one embodiment of the present disclosure may first receive the user's member information generated by using the user information in the step S610.

Furthermore, subsequent to the providing of the total price, when the user's payment for the products is completed, purchase points corresponding to the third price may be accumulated in member points included in member information (S910).

In this case, the step S910 may assign additional purchase points at a preset first ratio corresponding to a ratio of a number of products whose barcodes are recognized through the scanning unit to a number of products purchased by the user.

Furthermore, the step S660 may provide a fourth price with a discount rate of a preset second ratio corresponding to a section including the membership points applied to the third price to the user terminal.

As an optional embodiment, prior to the step S660, a first product list for products sorted into the first zone and a second product list for products sorted into the second zone may be prepared, and the prepared first product list and second product list may be provided to a user terminal.

Specifically, the unmanned store product checkout device may first generate a first product list for products sorted into a first zone.

In this case, a preset first or second mark may be displayed next to each product name included in the first product list.

Here, the first preset mark may denote that a barcode has been scanned through a barcode scanner to acquire scanned product information, and the barcode has been verified to match the acquired scanned product information.

In addition, the preset second mark may denote that image information of a product is acquired through an image scanner, scanned product information is acquired based on the image information, and the image information has been verified to match the acquired scanned product information.

Next, the unmanned store product checkout device may generate a second product list for products sorted into a second zone when the products sorted into the second zone have been checked by an administrator.

In this case, a preset third mark may be displayed next to each product name included in the second product list.

Here, the third preset mark may denote that the product is an unchecked product or a product that has been verified as a different product from the scanned product information and checked by the administrator.

As an optional embodiment, the step S660 may provide, when providing a total price to the user terminal, the first product list and the second product list to the user terminal.

In this case, the first product list and the second product list may include respective prices of products in the lists.

This may allow the user to check the products whose barcodes have been scanned using a barcode scanner. In addition, since the higher the percentage of products with scanned barcodes, the higher the membership points, and the higher the membership points, the higher the discount rate, the user may be guided to place products on the conveying unit so as to allow the barcodes to be easily scanned. Accordingly, as the number of products with scanned barcodes increases, the number of products requiring a check by the administrator decreases, thereby having an effect of reducing a time required for a product checkout.

Figure 10:
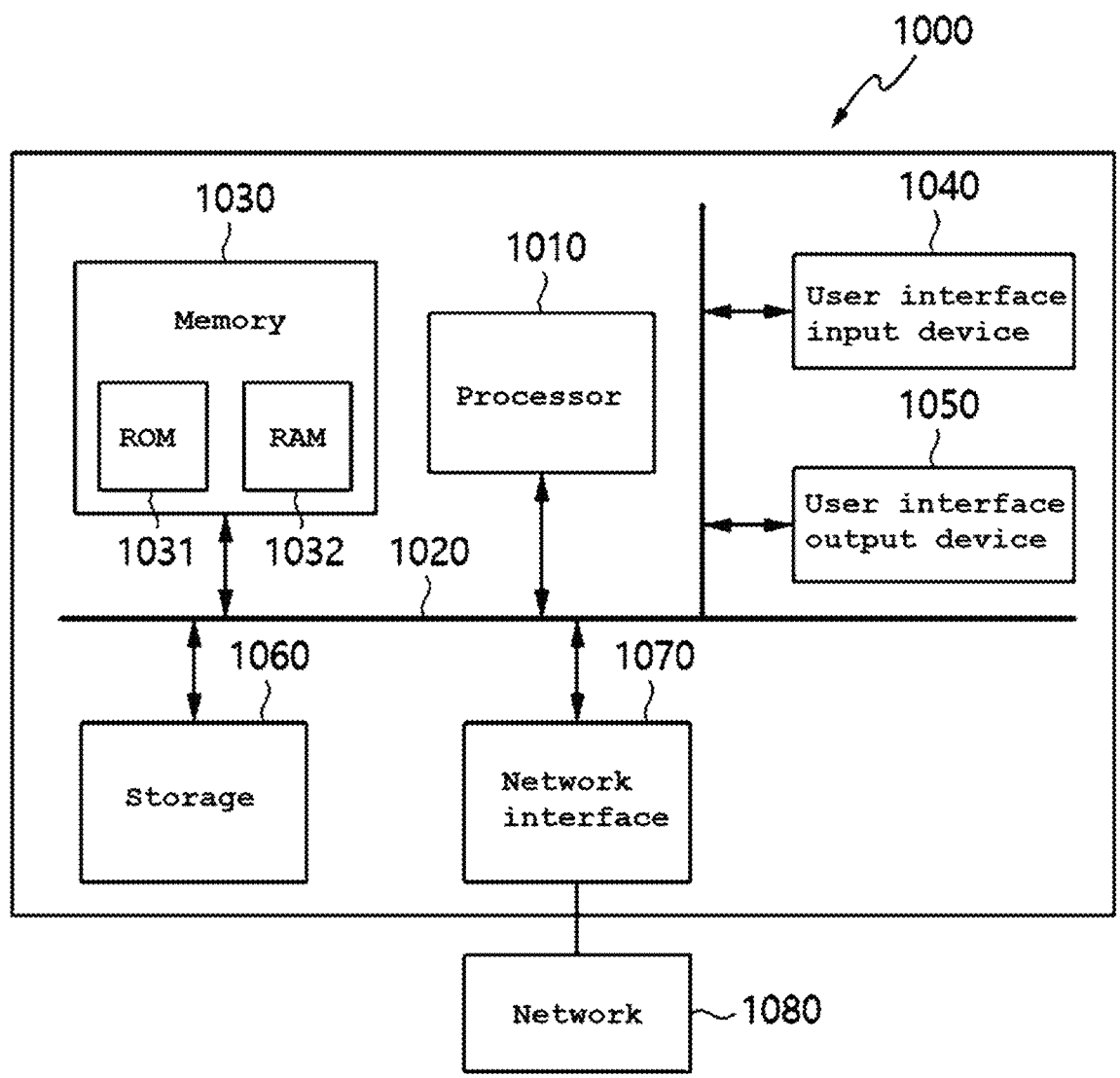
FIG. 10 is a diagram showing a computer system according to one embodiment of the present disclosure.

FIG. 10 is a diagram showing a computer system according to one embodiment of the present disclosure.

A device of providing a used goods transaction service using a smart box according to one embodiment of the present disclosure may be implemented in a computer system 1000 such as a computer-readable recording medium.

Referring to FIG. 10, the computer system 1000 may include one or more processors 1010, a memory 1030, a user interface input device 1040, a user interface output device 1050, and a storage 1060 that communicate with one another via a bus 1020. In addition, the computer system 1000 may further include a network interface 1070 connected to a network 1080. The processor 1010 may be a central processing unit or a semiconductor device that executes processing instructions stored in the memory 1030 or the storage 1060. The memory 1030 and the storage 1060 may be various types of volatile or non-volatile storage media. For example, the memory may include a ROM 1031 or a RAM 1032.

The specific implementations described in the present disclosure are embodiments, and do not limit the scope of the present disclosure in any way. For the sake of brevity of the specification, description of conventional electronic components, control systems, software, and other functional aspects of the systems may be omitted. Furthermore, connection lines or connection members between elements shown in the drawings, which are examples of functional connections and/or physical or circuital connections, may be represented by alternative or additional various functional connections, physical connections, or circuital connections in an actual device. In addition, unless an element is specifically described with the term such as "essential," "important," or the like, it may not be a necessary element for the application of the present disclosure.

Accordingly, the concept of the present disclosure should not be limited to the above-described embodiments, and the following claims as well as all equivalents or modifications thereof are intended to fall within the scope of the concept of the disclosure.

An unmanned store product checkout device according to embodiments of the present disclosure provides an industrially applicable way of scanning products being conveyed, measuring weights thereof to identify the products, sorting the products based on a result of the identification, and calculating a total price so as to quickly and accurately check out the products.

The invention claimed is:

1. An unmanned store product checkout device, the device comprising:
a conveying unit configured to convey products to a user who wants to purchase to scan the products;
a product recognition unit disposed at a first point where a conveyance of the products is started by the conveying unit to recognize the products being placed on the conveying unit to start an operation of the conveying unit;
a scanning unit disposed to be separated from the conveying unit by a preset distance to scan barcodes and images of the products conveyed by the conveying unit;
a weight sensor disposed on a lower side of the conveying unit to measure weights to verify the scanned products;
a processor configured to identify the products using artificial intelligence learning data based on the barcodes and images of the products scanned through the scanning unit and the weights of the products measured through the weight sensor;
a product sorting unit disposed at a second point where the conveyance of the products is ended by the conveying unit to sort the products into a first zone or a second zone based on a result of identifying the products; and
a checkout unit configured to calculate a total price by adding up a first price, which is a sum of prices of the products sorted into the first zone, and a second price, which is a sum of prices of the products sorted into the second zone and checked by an administrator,
wherein the processor is configured to:
identify, when the barcodes are recognized, the products as the scanned products corresponding to identification information included in the barcodes;
acquire, when the barcodes are not recognized, products names and text strings from an image information, and identify the products as the scanned products based on the image information, product names, and text strings using the artificial intelligence learning data;
compare the weights of the products measured using the weight sensor with weight information included in a product information corresponding to the scanned products, and transmit, when the products are verified as the scanned products as a result of comparison, a first signal instructing the scanned products to be sent to the user to the product sorting unit; and
transmit, when the products are not identified as the scanned products or are verified as not the scanned products as the result of comparison, a second signal instructing the products to be sent to the administrator to the product sorting unit.

2. The device of claim 1, wherein the scanning unit comprises:
a barcode scanner configured to recognize the barcodes of the products; and
an image scanner configured to scan the images of the products to acquire the image information.

3. An unmanned store product checkout device, the device comprising:
a conveying unit configured to convey products to a user who wants to purchase to scan the products;
a product recognition unit disposed at a first point where a conveyance of the products is started by the conveying unit to recognize the products being placed on the conveying unit to start an operation of the conveying unit;
a scanning unit disposed to be separated from the conveying unit by a preset distance to scan barcodes and images of the products conveyed by the conveying unit;
a weight sensor disposed on a lower side of the conveying unit to measure weights to verify the scanned products;
a processor configured to identify the products using artificial intelligence learning data based on the barcodes and images of the products scanned through the scanning unit and the weights of the products measured through the weight sensor;

a product sorting unit disposed at a second point where the conveyance of the products is ended by the conveying unit to sort the products into a first zone or a second zone based on a result of identifying the products; and a checkout unit configured to calculate a total price by adding up a first price, which is a sum of prices of the products sorted into the first zone, and a second price, which is a sum of prices of the products sorted into the second zone and checked by an administrator, wherein the conveying unit does not operate when it is not recognized that the products have been placed thereon through the product recognition unit, operates, when it is recognized that the products have been placed thereon, to convey the products, and stops its operation when it is not recognized that another product has been placed until a preset period of time has elapsed subsequent to being recognized that the products have been placed through the product recognition unit.

4. An unmanned store product checkout method, the method comprising:

receiving user information from a user terminal;

recognizing products placed on a conveying unit through a product recognition unit;

scanning, when the products are recognized, the products conveyed by the conveying unit through a scanning unit;

verifying the products based on a result of the scanning the products, and sorting the products through a product sorting unit to allow the products to be sent to a user or administrator according to a result of verification;

calculating a total price by adding up prices of the sorted products through a checkout unit; and providing the total price to the user terminal, wherein the scanning of the products comprises:

scanning, when barcodes of the products are recognized, the barcodes to acquire scanned product information corresponding to the barcodes, scanning, when the barcodes of the products are not recognized, entire images of the products to acquire image information, designating, when the barcodes of the products are not recognized or the image information of the products is not acquired, the products as unchecked products, and acquiring, when the barcodes of the products are not recognized subsequent to the scanning of the products, product names of the products from the image information; and acquiring the scanned product information corresponding to the products for which the image information has been acquired based on the image information and the product names using artificial intelligence learning data, and wherein the artificial intelligence learning data comprises data learned from sizes of products, product names, and weights of products to be sold in an unmanned store.

5. The method of claim 4, wherein the sorting of the scanned products comprises:

measuring the weights of the products using a weight sensor;

comparing weight information of the scanned products included in the scanned product information with the measured weights of the products;

sorting, when the products are verified as the scanned products as a result of comparison, the products into a first zone so as to be sent to the user, and sorting, when the products are verified as different products as the result of the comparison or when the products are the unchecked products, the products into a second zone to be sent to the administrator; and transmitting a number of products sorted into the second zone, device information, and the user information to an administrator terminal.

6. The method of claim 5, wherein the calculating of the total price comprises:

recognizing that all products sorted into the first zone or the second zone have been purchased by the user; and calculating a third price by adding up both a first price, which is a sum of prices of the products sorted into the first zone and a second price, which is a sum of prices of the products sorted into the second zone.

7. The method of claim 6, wherein the receiving of the user information comprises:

receiving a membership information of the user generated using the user information; and subsequent to the providing of the total price, accumulating, when payment of the user for the products is completed, purchase points corresponding to the third price in membership points included in the membership information.

8. The method of claim 7, wherein the accumulating of the purchase points assigns additional purchase points at a preset first ratio corresponding to a ratio of a number of products whose barcodes are recognized through the scanning unit to a number of products purchased by the user, and wherein the providing of the total price provides a fourth price with a discount rate of a preset second ratio corresponding to a section including the membership points applied to the third price to the user terminal.

* * * * *